US008549946B2

(12) United States Patent
Pang (10) Patent No.: US 8,549,946 B2
(45) Date of Patent: Oct. 8, 2013

(54) ELASTIC COUPLE BARRING APPARATUS (76) Inventor: Zijing Pang, Shandong (CN)

(*) Notice: Subject to any disclaimer, the term of this patent is extended or adjusted under 35 U.S.C. 154(b) by 2048 days.

(21) Appl. No.: 10/529,283

(22) PCT Filed: Sep. 12, 2003

(86) PCT No.: PCT/CN03/00767
§ 371 (c)(1),
(2), (4) Date: Mar. 25, 2005

(87) PCT Pub. No.: WO2004/029419
PCT Pub. Date: Apr. 8, 2004

(65) Prior Publication Data
US 2005/0274214 A1 Dec. 15, 2005

(30) Foreign Application Priority Data
Sep. 30, 2002 (CN) ..................................... 2135704

(51) Int. Cl.
*F16H 1/06* (2006.01)
*F16H 1/20* (2006.01)

(52) U.S. Cl.
USPC .......................................................... 74/414

(58) Field of Classification Search
USPC ............ 74/411, 414, 409, 440, 665 A, 665 B, 74/665 BE, 665 E, 421 A, 446–448
See application file for complete search history.

(56) References Cited

U.S. PATENT DOCUMENTS

| | | | | |
|---|---|---|---|---|
| 3,252,349 A | * | 5/1966 | Widdrington | 74/427 |
| 3,407,681 A | * | 10/1968 | Kiernan et al. | 74/448 |
| 4,083,259 A | | 4/1978 | Seliger et al. | 74/191 |
| 5,148,635 A | | 9/1992 | Porter et al. | |

FOREIGN PATENT DOCUMENTS

| | | |
|---|---|---|
| CN | 92210670.3 | 10/1992 |
| CN | 92219180.8 | 12/1992 |
| CN | 99222132.3 | 6/2000 |

(Continued)

OTHER PUBLICATIONS

English translation of CN 99222132.3.*

(Continued)

*Primary Examiner* — James Pilkington
(74) *Attorney, Agent, or Firm* — Global IP Services; Tianhua Gu (57) ABSTRACT An elastic couple barring apparatus (i.e., an elastic couple rotor turning gear) is a special tool to drive a rotor by elastic couple for adjusting a shafting center of a vertical hydroelectric generating set and other rotating devices. The elastic couple rotor turning gear is characterized in that an elastic support is mounted on a frame of the driven device, a casing being connected to the elastic support, a casing cover being firmly fixed on the casing, a speed reducer and an electric motor being installed on the cover, an output shaft of the speed reducer extending into the casing under the casing cover, the output shaft having a pinion gear mounted thereon and meshed with a gear body of a bull gear positioned in the casing, the bull gear being connected to a shaft coupling through parallel keys via a key seat or an upright post, and the shaft coupling being fixed on a rotor of the driven device. The advantages of the invention is that the structure is more reasonable, the concentricity may be adjusted more conveniently, the elastic connection makes operation easy and vibration small, deformation caused by suspending arms is eliminated, and operation's accuracy and precision are improved because the gears may be meshed and operated smoothly.

17 Claims, 6 Drawing Sheets (56) References Cited

FOREIGN PATENT DOCUMENTS

| GB | 544 648 A | 4/1942 |
| JP | 08-296407 | 11/1996 |
| JP | 2003189556 A | 7/2003 |

OTHER PUBLICATIONS

Supplementary European Search Report from European Application No. EP 03 79 8036 dated Jan. 3, 2006.

* cited by examiner

ELASTIC COUPLE BARRING APPARATUS

TECHNICAL FIELD

This invention relates to a special tool to drive a rotor by elastic couple for adjusting a shafting center of a vertical hydroelectric generating set and other rotating devices, and particularly to an elastic couple barring apparatus (i.e., an elastic couple rotor turning gear).

BACKGROUND OF THE INVENTION

During adjusting a shafting center of vertical hydroelectric generating set, a rotor needs to be driven by an external force so as to check the radial swinging angle of each section. Thus, an even and smooth driving rotation speed, and accurate stop points are required. Furthermore, the rotor should be in a thoroughly free status at each stop point without any disturbance external force exerting on the rotor. Moreover, it should be convenient and quick to operate in the field. However, the driving method provided by most manufacturers still employs manual driving and came hauling, which causes low safety, high labor intensity and inefficient works. The applicant of the present invention has two Chinese patents on improvement of the conventional barring method by providing a new automatic rotor turning gear: one is Chinese Patent No. 92219180.8 and the other is Chinese Patent No. 99222132.3. However, the two patents still have some shortcomings as follows. The automatic rotor turning gears have a low concentricity with the rotating devices. There is a rigid connection between the automatic rotor turning gear and a frame of the rotating device, so that a little deviation between axes of the rotor turning gear and the rotor may causes an excessive and unstable driving moment of force, which requires a long time to adjust. Arms of force of the above devices is very long and the pinion gear is assembled in a suspension arm structure, so the two structures may be easily deformed under stress to cause incorrect engagement between gears. Moreover, wires may be twisted because the motor is turned along with the device.

SUMMARY OF THE INVENTION

The purpose of this invention is to overcome the shortcomings of the above-mentioned technique and provide an elastic couple barring apparatus (i.e., an elastic couple rotor turning gear). When the apparatus is used for adjusting a shafting center of vertical hydroelectric generating set and other rotating devices, the working intensity may be reduced, working conditions may be improved, an operating adjusting time may be shortened, working efficiency and adjusting accuracy may be enhanced, and the complicated and massive generating set may be easily turned.

The purpose of this invention is achieved as follows. An elastic couple rotor turning gear is characterized in that an elastic support 5 is mounted on a frame 6 of a driven device, a casing 4 with a U-shaped cross section being connected to the elastic support for providing an elastic connection between the frame 6 of the driven device and the elastic couple rotor turning gear, a casing cover 3 being firmly fixed on the casing, a speed reducer 2 and an electric motor 1 being installed evenly or symmetrically positioned at an angle of 180°, an output shaft 16 of the speed reducer extending into the casing 4 under the casing cover 3, the output shaft 16 having a pinion gear 7 mounted thereon and meshed with a gear body 81 of a bull gear 8 positioned in the casing, the bull gear being connected to a shaft coupling 9 through parallel keys 10 via a key seat 83 or an upright post 84, and the shaft coupling 9 being fixed on a rotor 12 of the driven device.

The elastic support includes an upper ring 51 and a lower ring 52. The upper ring and the lower ring are connected via a plurality of elastic ribs 53. The elastic ribs 53 are made of elastic materials with a rectangular, groove-shaped, T-shaped, I-shape, circular or other cross section. When a little deviation occurs between the center of the elastic couple rotor turning gear and the driven rotor, a radial resisting stress caused by this deviation is eliminated by the elastic support 5, which provides a convenient operation in a situation, and stable and safer running.

According to the specific structure of the rotor of the driven device, the shaft coupling 9 can be of an integral or separable type. When the separable type shaft coupling 9 is used, the shaft coupling 9 is connected to the rotor 12 of the driven device through multiple radial linkages 11 to make force on the rotor 12 of the driven device even and stab.

An axial sliding clearance 13 and a radial sliding clearance 14 are formed between the gear unit 81 of the bull gear and a horizontal surface and an inner wall of the casing to form a sliding bearing to ensure concentric rotation between the bull gear 8 and the casing 4 with U-shape cross section.

An air clearance is defined between the inner wall of the bull gear and the shaft coupling, and three screws 15 for adjusting concentricity are evenly distributed along the circumference of the shaft coupling. By adjusting the screw 15, the concentricity between the stationary and rotating parts can be adjusted. The casing 4 is filled with lubricating oil to ensure normal operation of bearings.

The key seat 83 is defined on the inner wall 82 of the bull gear with a free rotating angle on the seat to remove the rotor of the device from external force easily and make the rotor in a fully free status. Alternatively, an upright post 84 is mounted on the bull gear corresponding to the parallel key 10 to transmit a torque. In this case, the key of the shaft coupling corresponds to the height of the upright post, so that the shaft coupling has a free rotating angle of a 180°.

The working principle of the elastic couple rotor turning gear is described as follows. When the control mechanism is powered on, the electrical motors 1 evenly or symmetrically in 180° position distributed along the circumference may drive the speed reducers 2 and pinion gears 7 to rotate, and the pinion gears then drive the engaged bull gears 8 to rotate. Pushed by equal tangential forces, and limited by the sliding bearing including the axial sliding clearance 13 and radial sliding clearance 14, the bull gear may run smoothly. The bull gear 8 drives the shafting coupling 9 through the parallel keys 10, while the shafting coupling 9 drives the rotor of the driven device 12 to rotate smoothly through the linkages 11. When the elastic couple rotor turning gear rotates the driven device 12 and stops at a certain position, it turns back with a little angle to position the parallel key 10 into the free rotating angle so as to remove the rotor of the driven device from the external force. Therefore, the rotor of the driven device will be freely rotated to ensure accurate measurements. When the elastic couple rotor turning gear is installed for the first time, the concentricity between the stationary and rotating parts is adjusted by using the three screws 15. After adjustment, the elastic support 5 is firmly mounted on the frame of the driven device 6, and the three screws 15 for adjusting the concentricity are removed.

The present invention has following advantages. The apparatus has a more reasonable and simple structure, and it is easy to adjust the concentricity because the screws is provided at more reasonable positions. The elastic support is used instead of the conventional rigid support. Therefore, the apparatus has an improved self-stabilization performance and a small vibration during rotating, and can be operated easily. By using the casing cover, the conventional suspension arm is replaced with the fixed structure. Thus, the deformation due to the suspension arm is eliminated so that the running process of the gear engagement is smoother and the running precision and accuracy are enhanced. The gear transmission is concealed in the enclosed casing so that the apparatus can be operated safely and maintained easily and wire twisting is avoided.

DETAILED DESCRIPTION OF THE INVENTION

Detailed embodiments will be explained by reference to the accompanying figures.

Embodiment 1

Figure 1:
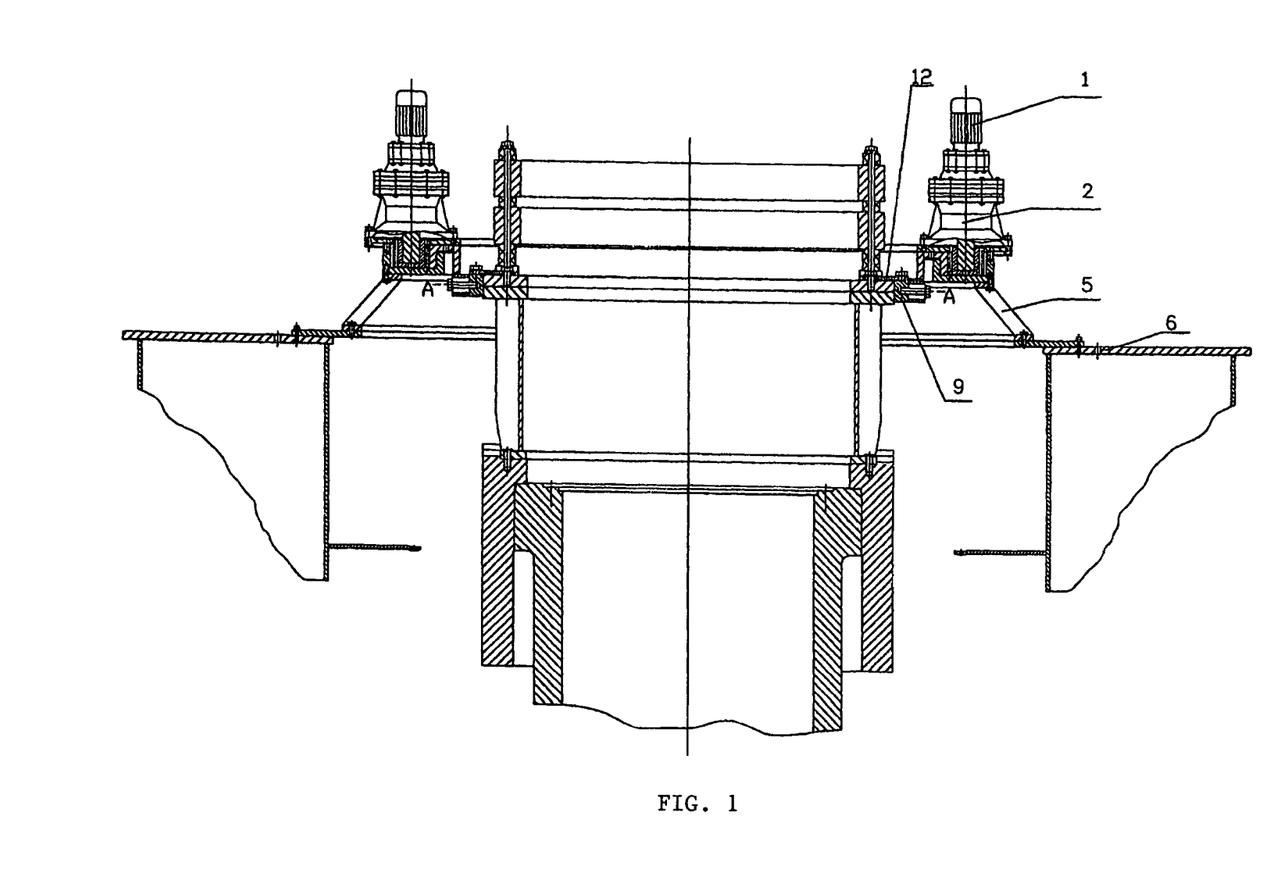
FIG. 1 is a schematic diagram of an elastic couple rotor turning gear installed on a rotor of a driven device.
Figure 2:
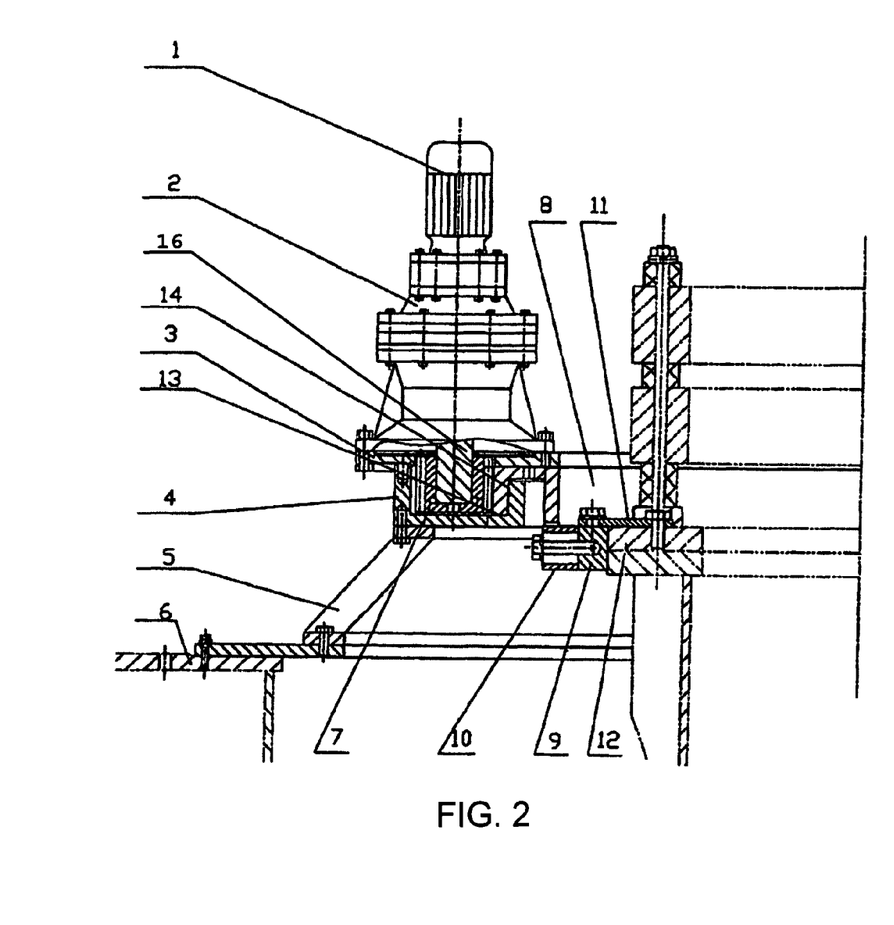
FIG. 2 is a schematic diagram of the elastic couple rotor turning gear.
Figure 3:
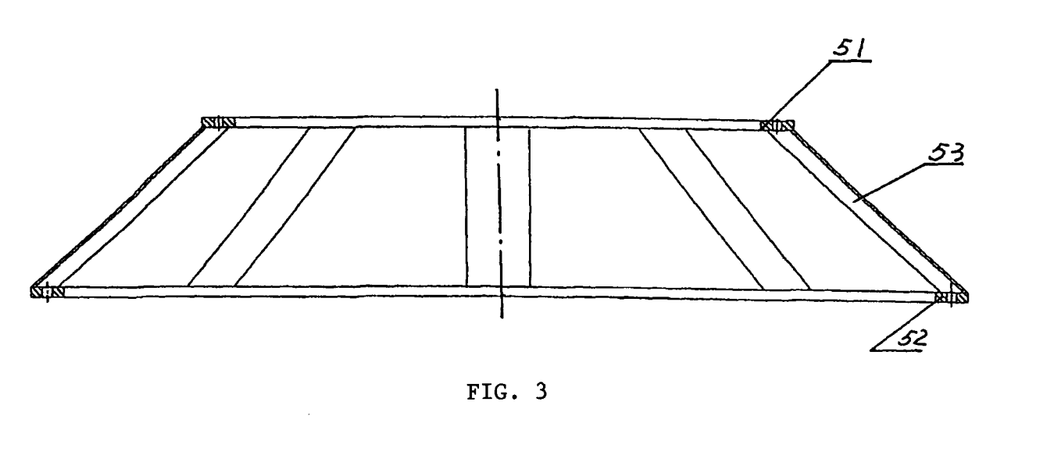
FIG. 3 is a schematic diagram of an elastic support.
Figure 4:
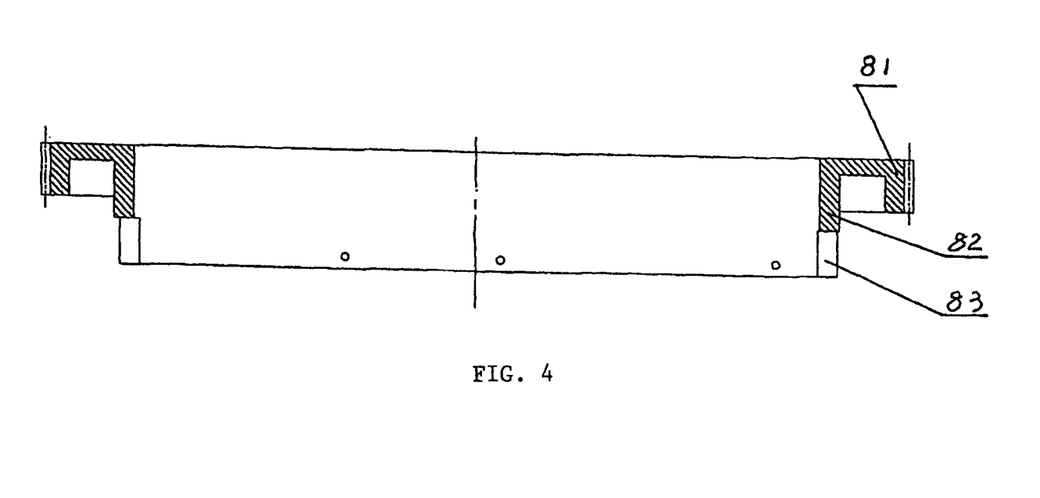
FIG. 4 is a schematic diagram of a bull gear.
Figure 5:
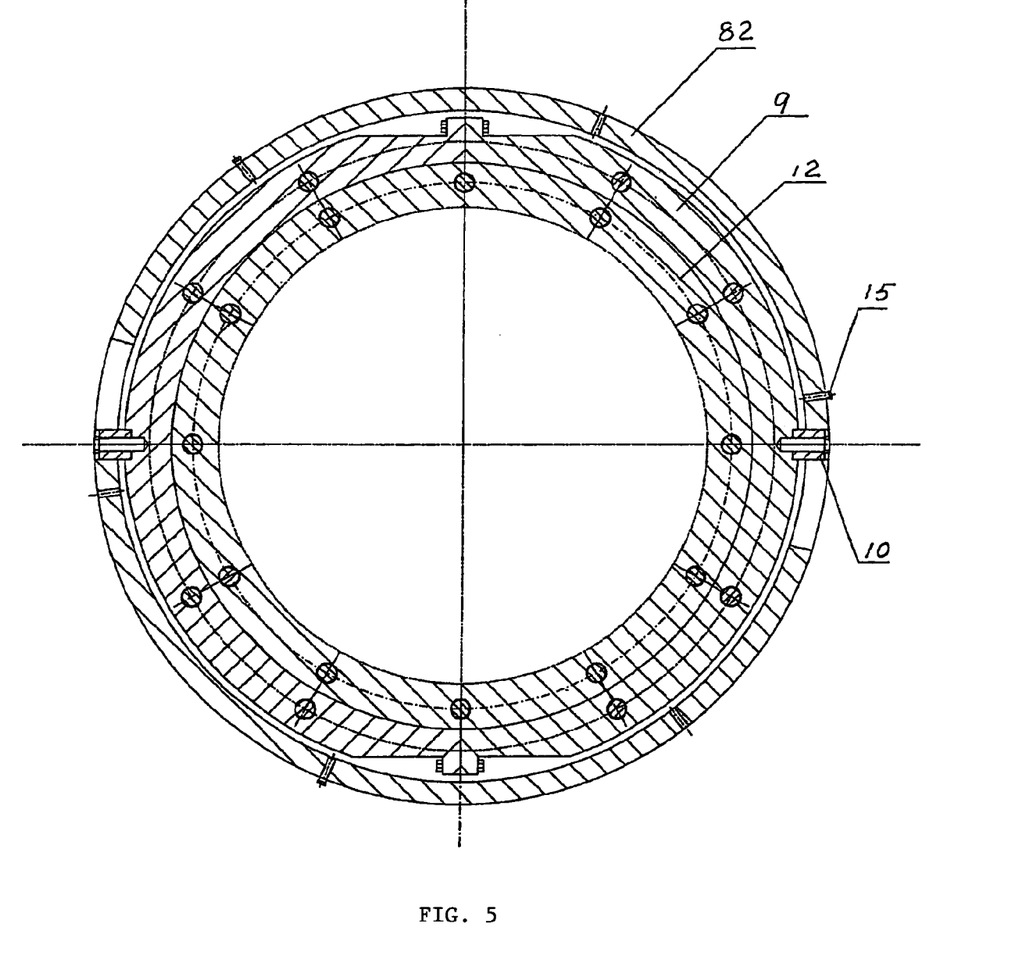
FIG. 5 is a sectional view along the line A-A.

Referring to FIG. 1, an elastic couple rotor turning gear is installed on a top frame 6 of a light hydroelectric generating set for adjusting a shafting center of the generating set. An elastic support 5 is connected to the top frame 6 of the driven device. FIGS. 2 and 3 show the elastic support 5 including the upper ring 51, the lower ring 52 and eight elastic ribs 53 between the upper and lower rings. The upper ring is a round ring with a diameter of 2.6 m and the lower ring is a round ring with a diameter of 3.8 m. The elastic ribs 53 are made of spring steel having a rectangular cross section. A ring-like casing 4 with a U-shape cross section is mounted on the elastic support. An elastic connection is established between the top frame 6 of the hydroelectric generating set and the elastic couple rotor turning gear. The casing 4 includes a casing cover 3 firmly fixed thereon. Two speed reducers 2 each with an electric motor 1 are installed on the casing cover and symmetrically positioned at an angle of 180° to form a couple. The speed reducer 2, casing cover 3 and the casing 4 are rigidly connected together. The electric motor has a power of 1.1 KW and a rotating speed of 1500 rpm. The output rotating speed of the speed reducer is 1 rpm. The output shaft 16 of the speed reducer extends into the casing 4 under the casing cover 3. A module of the pinion gear 7 connected to the output shaft 16 and a module of a bull gear 8 meshed with the pinion gear are both 10. The gear body 81 of the bull gear is received in the casing 4 and two key seats 83 are defined on an inner wall 82 of the bull gear. Two parallel keys 10 are respectively received in the key seats 83 for connecting the bull gear 8 and a shafting coupling 9 to transmit the moment of couple.

The two parallel keys 10 are symmetrically positioned at an angle of 180°. According to the structure of the rotor of the driven device, the shafting coupling 9 is an integral type which is connected to an end of the rotor 12 of the driven device.

An axial sliding clearance 13 is defined between the gear body 81 in the casing and a horizontal surface of the casing to form a plane sliding friction, and an radial sliding clearance 14 about 0.5 mm is defined between the gear body 81 and an inner wall of the casing to form a sliding bearing to ensure the bull gear 8 concentric with the casing 4.

Three screws 15 for adjusting concentricity between the bull gear and the shaft coupling are evenly distributed along a circumference of the shaft coupling on the inner wall of the bull gear corresponding to the shaft coupling. The casing 4 is filled with lubricating oil to ensure normal operation of the bearings.

Embodiment 2

This elastic couple rotor turning gear is installed on the top frame 6 of a heavy hydroelectric generating set for adjusting shafting center of the generating set. An elastic support 5 is connected to the top frame 6 of the driven device. FIGS. 2 and 3 show the elastic support 5 including an upper ring 51, a lower ring 52 and twelve elastic ribs 53 between the upper and lower rings. The upper ring 51 is a round ring with a diameter of 2.8 m, and the lower ring 52 is a round ring with a diameter of 4.1 m. The elastic ribs 53 are made of spring steel with a trough shape cross section. A ring-like casing 4 with a U-shape cross section is mounted on the elastic support 5. An elastic connection is established between the top frame 6 of the hydroelectric generating set and the elastic couple rotor turning gear. The casing 4 has a casing cover 3 firmly fixed thereon. Two pairs of (four) speed reducers 2 each with an electric motor 1 are installed on the casing cover to form two couples, which synchronously and equally drive the rotor of hydroelectric generating set, wherein the two speed reducers and electric motors in each pair are symmetrically positioned at an angle of 180°. The electric motor has a power of 0.75 KW and a rotating speed of 1500 rpm. The output rotating speed of the speed reducer is 0.8 rpm. The output shaft 16 of the speed reducer extends into the casing 4 under the casing cover 3. The module of the pinion gear 7 connected to the output shaft 16 and the module of the bull gear 8 meshed with the pinion gear are 10. The gear body 81 of the bull gear is received in the casing 4 and two key seats 83 are defined on an inner wall 82 of the bull gear. Two parallel keys 10 are respectively received in the key seats 83 for connecting the bull gear 8 and a shafting coupling 9.

The two parallel keys 10 are symmetrically positioned at an angle of 180°. According to the specific structure of the rotor of the driven device, the shafting coupling 9 is a separable type including two parts, which is connected to the rotor 12 of the driven device by ten radial linkages 11.

Embodiment 3

Figure 6:
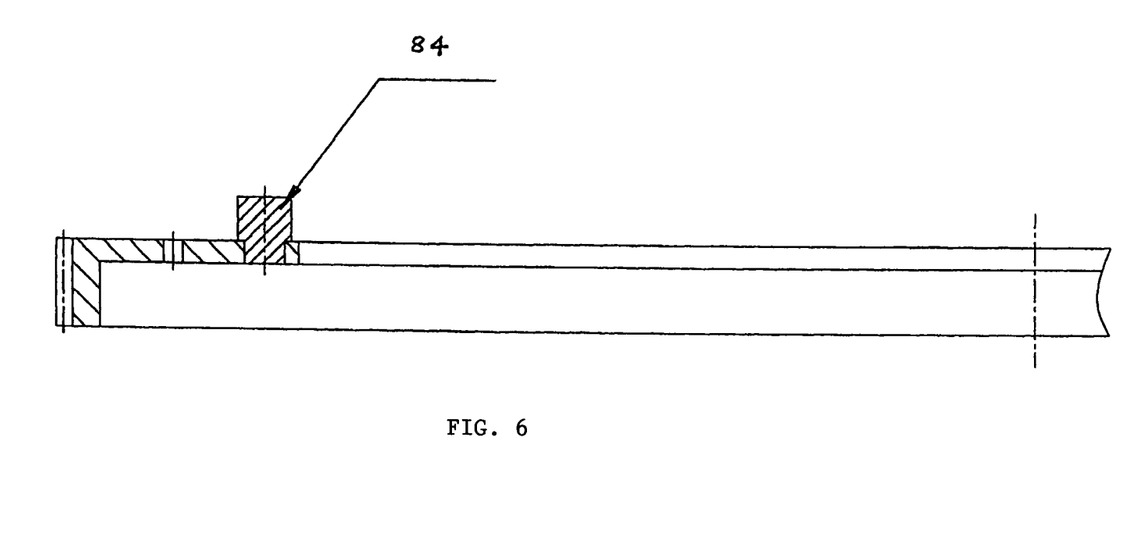
FIG. 6 is a schematic diagram of the bull gear with an upright post.
Figure 7:
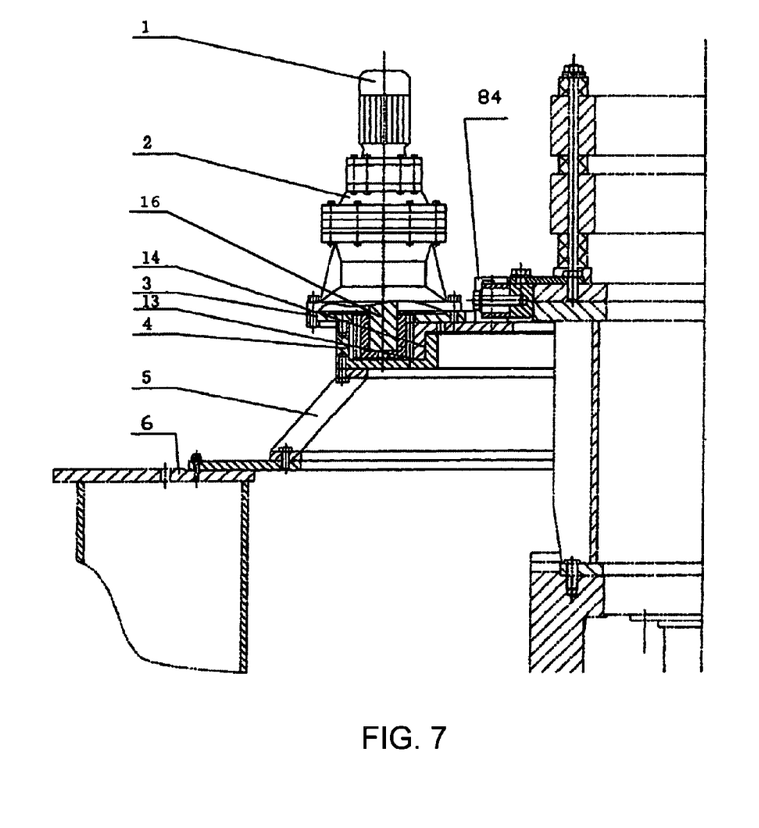
FIG. 7 is a schematic diagram of the elastic couple rotor turning gear including a bull gear with an upright post.

This elastic couple rotor turning gear is used for adjusting a shafting center of a super-heavy hydroelectric generating set, and includes three pairs of (six) identical speed reducers each with an electric motor to form three couples, which synchronously and equally drive the rotor of the hydraulic generating set, wherein the two speed reducers and two electric motors in each pair are symmetrically positioned at an angle of 180°. FIG. 6 shows that an upright post 84 is mounted on the bull gear 8 to correspond to the parallel keys for transmitting torque. In this case, the key of the shaft coupling corresponds to the height of the upright post so that the shaft coupling has a free rotating angle of 180°. The structure of this elastic couple rotor turning gear is illustrated in FIG. 7.

Whether the number of the elastic couple rotor turning gears is even or odd, the purpose of this invention can be realized as long as the apparatuses are evenly distributed and positioned.

What is claimed is:

1. An elastic couple rotor turning gear for driving a driven device to rotate, comprising at least two driving units symmetrically arranged around the driven device for evenly rotating the driven device, wherein each of the driving units (7) is connected to a frame (6) of the driven device through a substantially elastic support (5).

2. The elastic couple rotor turning gear of claim 1, wherein the substantially elastic support (5) includes an upper ring (51), a lower ring (52), and a plurality of substantially elastic ribs (53) connecting the upper ring (51) and the lower ring (52).

3. The elastic couple rotor turning gear of claim 2, wherein each of the driving units further comprises a casing (4) and a casing cover (3) forming an enclosure accommodating a pinion gear (7) and a bull gear body (81) therein.

4. The elastic couple rotor turning gear of claim 3, wherein the casing (4) is connected to the upper ring (51), and the lower ring (52) is connected to the frame (6) of the driven device.

5. The elastic couple rotor turning gear of claim 3, wherein an axial sliding clearance (13) and a radial sliding clearance (14) are formed between the bull gear body (81) and the casing (4).

6. The elastic couple rotor turning gear of claim 2, wherein the driven device comprises a rotor (12).

7. The elastic couple rotor turning gear of claim 6, wherein each of the driving units comprises a pinion gear (7) adapted to mesh with a bull gear body (81) of a bull gear (8).

8. The elastic couple rotor turning gear of claim 7, wherein the bull gear (8) is adapted to drive the rotor (12) through a shaft coupling (9) connected to the rotor (12).

9. The elastic couple rotor turning gear of claim 8, wherein the bull gear (8) is adapted to drive the shaft coupling (9) via an engagement of a key (10) and a key seat (83) or an upright post (84).

10. The elastic couple rotor turning gear according to claim 9, wherein an air clearance is formed between an inner wall of the bull gear (8) and the shaft coupling (9), and three screws (15) for adjusting concentricity are evenly distributed along a circumference of the shaft coupling (9).

11. The elastic couple rotor turning gear of claim 9, wherein the bull gear (8) is adapted to turn back so as to remove the rotor (12) from an external force.

12. An elastic couple rotor turning gear, comprising:
a substantially elastic support (5) is mounted on a frame (6) of a driven device, the substantially elastic support (5) including an upper ring (51) and a lower ring (52), the upper ring (51) being connected to the lower ring (52) through a plurality of substantially elastic ribs (53);
a casing (4) with a U-shaped cross section being connected to the substantially elastic support (5) for providing a substantially elastic connection between the frame (6) of the driven device and the elastic couple rotor turning gear; a casing cover (3) being firmly fixed on the casing (4);
a plurality of speed reducers (2), each with an electric motor (1), being installed evenly or symmetrically positioned around the driven device, each speed reducer (2) having an output shaft (16) extending into the casing (4) under the casing cover (3), the output shaft (16) having a pinion gear (7) mounted thereon and meshed with a gear body (81) of a bull gear (8) positioned in the casing (4), the bull gear being engaged with a shaft coupling (9) through keys (10) via a key seat (83) or an upright post (84), and the shaft coupling (9) being fixed on a rotor (12) of the driven device.

13. The elastic couple rotor turning gear according to claim 12, wherein an axial sliding clearance (13) and a radial sliding clearance (14) are formed between the gear body (81) of the bull gear (8) positioned inside the casing (4) and the casing (4).

14. The elastic couple rotor turning gear according to claim 12, wherein an air clearance is formed between an inner round wall (82) of the bull gear (8) and the shaft coupling (9), and three screws (15) for adjusting concentricity are evenly distributed along a circumference of the shaft coupling (9).

15. The elastic couple rotor turning gear according to claim 12, wherein the bull gear (8) includes the key seat (83) on an inner round wall (82) thereon or the upright post (84) being mounted on the bull gear (8).

16. An elastic couple rotor turning gear for driving a driven device, comprising:
at least two pinion gears (7) symmetrically arranged around the driven device, each adapted to mesh with a bull gear (8), said bull gear (8) being adapted to drive a rotor (12) through an engagement between a key seat (83) or an upright post (84) provided on a bull gear (8) and a key (10) provided on a shaft coupling (9) connected to the rotor (12);
a casing (4) and a casing cover (3) forming a housing for accommodating the pinion gears (7) and a bull gear body (81) therein;
a substantially elastic support (5) comprising an upper ring (51), a lower ring (52), and a plurality of substantially elastic ribs (53) connecting the upper ring (51) and the lower ring (52), the casing (4) being mounted on the upper ring (51), and the lower ring (52) is fixed on a frame (6) of the driven device; and
at least two electric motors (1), each for driving a corresponding pinion gear (7) through an output shaft (16) of a speed reducer (2) mounted on the casing cover (3).

17. The elastic couple rotor turning gear according to claim 16, wherein an air clearance is formed between an inner wall of the bull gear (8) and the driven device, and three screws (15) for adjusting concentricity are evenly distributed around the driven device.

* * * * *